US008836509B2

(12) United States Patent
Lowy

(10) Patent No.: US 8,836,509 B2
(45) Date of Patent: Sep. 16, 2014

(54) SECURITY DEVICE

(75) Inventor: Jonathan David Lowy, Auckland (NZ)

(73) Assignee: Direct Payment Solutions Limited (NZ)

( * ) Notice: Subject to any disclaimer, the term of this patent is extended or adjusted under 35 U.S.C. 154(b) by 603 days.

(21) Appl. No.: 12/757,268

(22) Filed: Apr. 9, 2010

(65) Prior Publication Data

US 2010/0327856 A1    Dec. 30, 2010

(30) Foreign Application Priority Data

Apr. 9, 2009 (NZ) ........................................ 576215

(51) Int. Cl.
*G08B 13/14* (2006.01)
*G06F 21/86* (2013.01)

(52) U.S. Cl.
CPC ..................................... *G06F 21/86* (2013.01)
USPC ................ 340/571; 29/832; 29/850; 29/830; 29/831; 29/842; 257/723; 257/731; 257/678; 257/679; 361/752; 361/760

(58) Field of Classification Search
USPC ................. 340/571–572.9; 29/830, 831, 842; 361/760, 752; 257/678, 679, 731
See application file for complete search history.

(56) References Cited

U.S. PATENT DOCUMENTS

| 5,027,397 | A | * | 6/1991 | Double et al. ................. 713/194 |
| 5,224,430 | A | | 7/1993 | MacPherson |
| 5,289,785 | A | | 3/1994 | MacPherson et al. |
| 5,315,656 | A | | 5/1994 | Devaux et al. |
| 5,539,379 | A | * | 7/1996 | MacPherson ................. 340/550 |
| 5,675,319 | A | | 10/1997 | Rivenberg et al. |
| 6,185,507 | B1 | | 2/2001 | Huber et al. |
| 6,226,165 | B1 | | 5/2001 | Collins et al. |
| 6,747,217 | B1 | | 6/2004 | Jochym et al. |
| 6,853,093 | B2 | * | 2/2005 | Cohen et al. ................... 257/678 |
| 6,895,509 | B1 | * | 5/2005 | Clark ............................... 726/23 |
| 6,957,345 | B2 | * | 10/2005 | Cesana et al. ................ 713/194 |
| 6,983,378 | B1 | | 1/2006 | Kokubo |
| 7,015,823 | B1 | | 3/2006 | Gillen et al. |
| 7,054,162 | B2 | * | 5/2006 | Benson et al. ................ 361/760 |
| 7,274,289 | B2 | | 9/2007 | Kerr et al. |
| 2007/0038865 | A1 | * | 2/2007 | Oggioni et al. ............... 713/178 |
| 2008/0036598 | A1 | | 2/2008 | Oggioni |
| 2009/0008145 | A1 | | 1/2009 | Chen et al. |

* cited by examiner

*Primary Examiner* — George Bugg
*Assistant Examiner* — Anthony D Afrifa-Kyei
(74) *Attorney, Agent, or Firm* — Waddey & Patterson, P.C.; Emily A. Shouse

(57) ABSTRACT

A security device for protecting stored sensitive data includes a closed housing including an array of conductor paths and tamper detecting means adapted to detect a change in impedance of the array of conductor paths above a predetermined threshold value.

8 Claims, 9 Drawing Sheets

SECURITY DEVICE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: NZ 576215 filed Apr. 9, 2009

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Field of the invention

The invention relates generally to the field of secure electronic devices. More particularly, the invention relates to secure electronic boxes having tamper alarms In the modern world, where sensitive personal data is increasingly stored and transmitted electronically, the ability to protect this data is vital. In particular, financial data such as credit card numbers or the like are often required to be stored and transmitted securely. The use of credit card payment machines provides significant convenience for members of the public to pay for a variety of every day goods or services. They are found in shops, restaurants, car parks, petrol stations, toll booths and many other public places. These and similar machines must inevitably at least temporarily store and transmit personal financial data to a transaction processing agent or bank. Ensuring the data is secure provides significant challenges.

One level of protection is to encrypt the data such that the data can only be decoded using the appropriate decryption key. However, in order to encrypt the data in the first place the encryption keys must be stored in or transmitted to the encrypting electronic device, which may be susceptible to tampering.

Known "tamper-proof" electronic security devices employ methods to protect sensitive data and/or encryption information by monitoring tamper attempts and triggering a tamper event if an attempt is detected. The device then erases its memories of sensitive information including encryption keys.

Typical security devices encase the main printed circuit board (PCB) in either a flexible or rigid "box" having one or more grids of fine traces which are used to determine if an attacker has penetrated the box. If a trace is broken, and in some devices if adjoining traces are shorted together, the device initiates a tamper event. Some devices have such grids on all sides to form a box.

US 2007/0038865 discloses a tamper-proof cap adapted to be mounted on a large assembly. The cap comprises a structure forming an open chamber in which the devices to be protected are placed. Tamper-proof layers form the top and bottom of the device and a plurality of vias are disposed around the open chamber to enclose the devices. The vias are arranged to prevent a probe being inserted without creating a short or open circuit which can be detected.

US 2008/0036598 discloses a tamper-proof structure for an electronic module comprising a pattern of signal lines having a highly unpredictable layout using space-filling curves. This prevents an attacker from determining the structure of the protective layer of the module.

U.S. Pat. No. 7,054,162 discloses a security module system and apparatus for protecting circuit components. The components are protected by a cover and a three-dimensional resistive network sensor comprising a complex grid of pseudo-randomly arranged conductor paths. A short or open circuit in the sensor is detected by a tamper detection circuit.

Since such known devices and methods detect only shorted or open circuits, they are still vulnerable to attacks because they cannot detect a bypassed or shorted section of the circuit. An attacker may penetrate a device by grinding or drilling a part of the PCB substrate until the grid areas are reached, attaching a wire to the exposed area of the grid and attaching the other end of the wire to another exposed section of the grid. This results in a shorted section of the grid and renders it ineffective. The attacker may then penetrate the grid within the shorted section and gain access to the secure components without being detected.

Some known devices rely on a caged structure of traces, wires or vias encased in an epoxy resin. One drawback with such a device is that the epoxy can be chemically dissolved without affecting the electronic circuit of the traces, wires or vias and leaving the structure exposed and vulnerable.

To further increase the level of protection of public data, a number of local or worldwide standards have been introduced, the security levels of which are increasing over time. Even in countries where it is not required to conform to such standards, it is at least desirable to do so. The PCI Security Standards Council, for example, requires approval of PIN entry devices and point-of-sale devices according to their published standards to gain their approval. Some known security devices do not meet all of the required security standards.

An additional problem of some known devices is that dust, dirt, water or other unwanted substances may penetrate the device, adversely affecting its operation and possibly jeopardizing the level of security provided.

Object of the Invention

It is an object of the invention to provide an improved security device for protecting stored sensitive data.

Alternatively, it is an object to provide an improved method of detecting tampering with a security device.

A further alternate object of the invention is to provide an improved security device for protecting transmitted sensitive data.

A still further alternate object of the invention is to provide an improved method of detecting tampering of a security device.

It is an object of the invention to at least provide the public with a useful choice.

BRIEF SUMMARY OF THE INVENTION

According to a first aspect of the invention, there is provided a security device for protecting stored sensitive data including:

a closed housing including an array of conductor paths; and tamper detecting means adapted to detect a change in impedance of the array of conductor paths above a predetermined threshold value.

Preferably, the closed housing is formed from a plurality of electrically connected layers.

Preferably, the closed housing contains a memory means adapted to store sensitive data.

Preferably, the array of conductor paths includes a grid of fine traces on at least one side of the closed housing.

Preferably, the array of conductor paths includes a plurality of vias on at least one side of the closed housing. Preferably, the vias electrically connect at least a subset of the electrically connected layers. Preferably, more than one row of vias is arranged in a closed loop around at least one of the plurality of electrically connected layers.

Preferably, the plurality of vias includes at least one buried via. The term "buried via" is used throughout this specification to refer to a via used to connect internal layers without being exposed on an outer layer of a PCB.

Preferably, the security device includes at least one conductor path of predetermined impedance between at least two of the plurality of vias.

Preferably, the security device include at least one conductor path of selected impedance between at least two of the plurality of vias.

Preferably, the tamper detecting means measures the impedance of the array of conductor paths periodically and compares the measured impedance with a prior measurement to detect a change in impedance.

Preferably, the array of conductor paths contains a plurality of paths having predetermined or selected impedance. More preferably, the plurality of paths having predetermined or selected impedance includes paths having a variety of impedances and/or wide impedance tolerances.

Preferably, the tamper detecting means is adapted to detect a change in resistance of the array of conductor paths above a predetermined threshold value.

Preferably, the array of conductor paths contains a plurality of paths of predetermined or selected resistance.

Preferably, the closed housing includes a layer of material adapted to seal the housing from dust or fluid penetration.

Preferably, the closed housing includes a layer of anisotropic electrically conductive tape. More preferably, the anisotropic electrically conductive tape principally conducts in a direction perpendicular to its plane, commonly referred to as "z-axis" electrically conductive tape.

According to a second aspect of the invention, there is provided a method of detecting tampering with a security device including:

forming a closed housing including an array of conductor paths; and detecting an attempt to penetrate the closed housing by detecting a change in impedance of the array of conductor paths above a predetermined threshold value.

Preferably, the closed housing is formed from a plurality of electrically connected layers.

Preferably, the method further includes containing a memory means adapted to store sensitive data with the closed housing.

Preferably, the method further includes connecting at least a subset of the plurality of electrically connected layers with vias.

Preferably, the method of detecting includes periodically applying a voltage to the array of conductor paths and/or periodically measuring the impedance of the array of conductor paths.

Preferably, the method further includes deleting the sensitive data as a result of detecting an attempt to penetrate the closed housing.

Preferably, the method further includes sending an alert as a result of detecting an attempt to penetrate the closed housing.

According to a third aspect of the invention, there is provided a secure interface device for protecting transmitted sensitive data including:

sensitive data transmission means; and security means adjacent to the sensitive data transmission means, wherein the security means is electrically connected to tamper detecting means adapted to detect an attempt to penetrate the security means Preferably, the security means includes an array of conductor paths arranged such that an attempt to penetrate the security means creates a short circuit or an open circuit, the short or open circuit being detected by the tamper detecting means.

Preferably, the tamper detecting means is adapted to detect a change in impedance of the array of conductor paths above a predetermined threshold value.

Preferably, the array of conductor paths includes a grid of fine traces.

Preferably, the security means may be formed from a substantially rigid or substantially flexible printed circuit board.

According to a fourth aspect of the invention, there is provided a method of detecting tampering of a secure interface device including:

positioning a sensitive data transmission means adjacent to a security means; and detecting an attempt to penetrate the security means by monitoring electrical properties of the security means.

Preferably, the method further includes forming an array of conductor paths arranged such that an attempt to penetrate the security means creates a short circuit or an open circuit. Preferably, the method further includes detecting the short or open circuit.

Preferably, the method further includes detecting a change in impedance of the array of conductor paths above a predetermined threshold value.

Preferably, the method further includes deleting sensitive data to be transmitted as a result of detecting an attempt to penetrate the security means.

Preferably, the method further includes terminating transmission of sensitive data as a result of detecting an attempt to penetrate the security means.

Preferably, the method further includes sending an alert as a result of detecting an attempt to penetrate the security means.

Further aspects of the invention, which should be considered in all its novel aspects, will become apparent to those skilled in the art upon reading of the following description which provides at least one example of a practical application of the invention.

BRIEF DESCRIPTION OF THE SEVERAL VIEWS OF THE DRAWINGS

One or more embodiments of the invention will be described below by way of example only, and without intending to be limiting, with reference to the following drawings, in which.

DETAILED DESCRIPTION OF THE INVENTION

Figure 1:
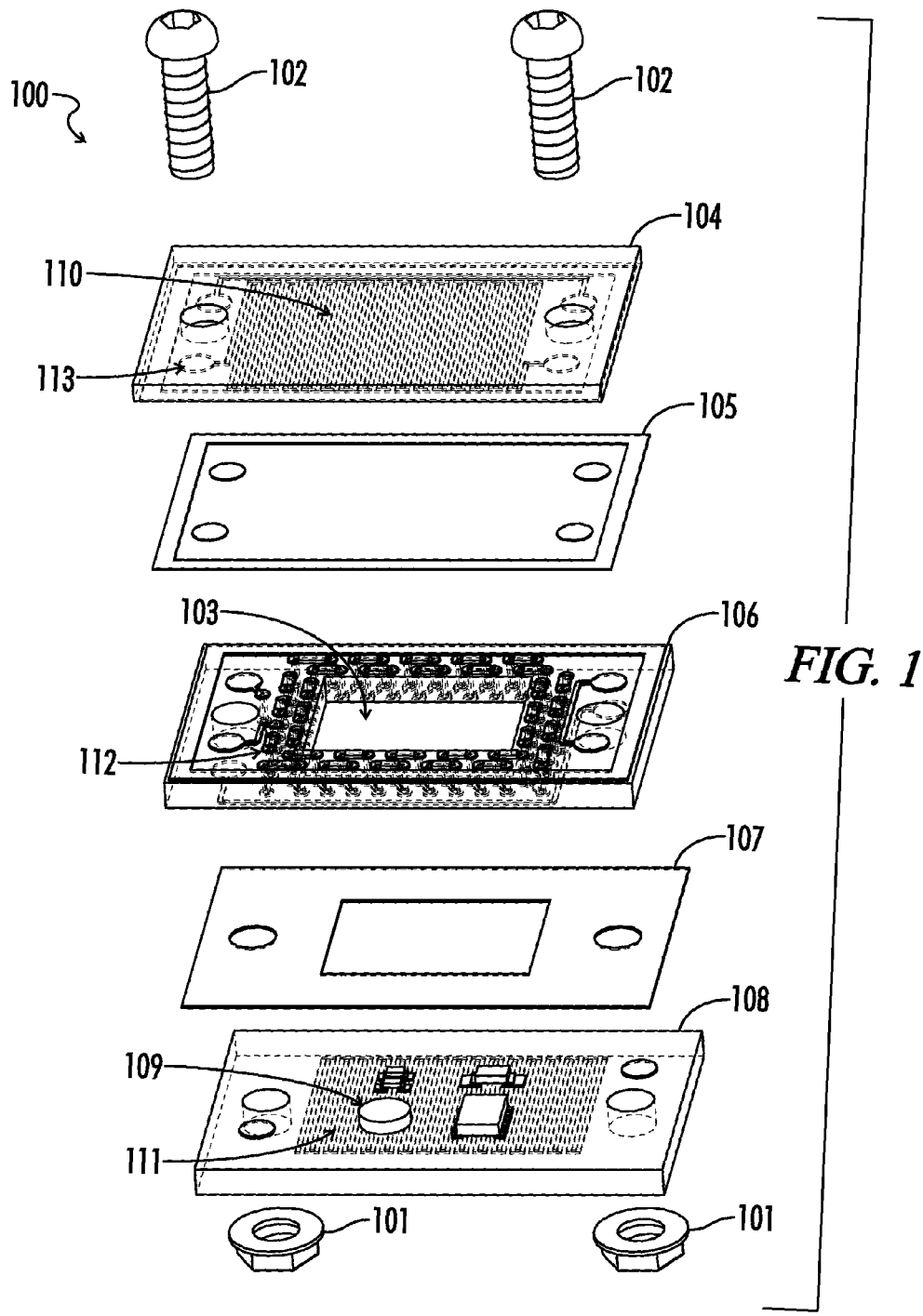
FIG. 1 is an exploded isometric view illustration of a security device according to an embodiment of the invention.

FIG. 1 illustrates an exploded view of a security device 100 according to an embodiment of the invention. Security device 100 includes five electrically connected layers, although other embodiments may include a different number of layers. The layers are held together by means of nuts 101 and bolts 102, the bolts passing through holes positioned in corresponding locations in each layer. Other methods of connecting the layers together are also possible according to the invention. For example, the layers may be held together by solder or adhesive, or the bolts 102 may penetrate the plastic molded parts.

When connected together, the layers of security device 100 form a closed housing having an internal cavity 103. Internal cavity 103 is formed because at least one of the middle layers of security device 100, in this case both layers 106 and 107, have holes in their middles whilst the upper and lower layers of security device 100 do not have holes in them. Internal cavity 103 is at least large enough to contain circuitry 109.

The topmost layer of security device 100 is layer 104, which includes on its underside an array of conductor paths which, in the embodiment shown in FIG. 1, are an array of fine traces 110 arranged in a grid-like pattern. Although positioned on the underside of layer 104, the array is visible seen from the topside of layer 104 in FIG. 1 for illustration purposes. Fine traces 110 are electrically connected to tamper detecting means described below either directly or by way of electrical connections between layers of security device 100. As will be known to those skilled in the art such electrical connections between layers may be enabled in a number of ways, but in the embodiment shown in FIG. 1 the layers are electrically connected by means of conductor pads such as 113 which contact corresponding conductor pads in a neighboring layer.

Immediately beneath layer 104 is layer 105, formed predominantly of solder. In other embodiments, other suitable materials are used. Layer 105 provides electrical connectivity between layers and environmental sealing of security device 100, as will be described further below.

Below layer 105 is layer 106 which, as already discussed, includes a hole to form internal cavity 103. The sides of layer 106 may, in some embodiments, form the sides of security device 100, although in other embodiments other layers may have sides which form the exterior sides of the security device, as will be known to those skilled in the art. In the embodiment shown in FIG. 1, layer 106 has a height substantially similar to the height of internal cavity 103, and thus is high enough to enable circuitry 109 to be completely contained by the closed housing when the layers of security device 100 are connected together.

Layer 106 includes an array of conductor paths positioned in a ring arrangement around the hole forming internal cavity 103. In the embodiment shown in FIG. 1, this array of conductor paths is a double row of vertical inter-PCB or intra-PCB conductor paths such as vias 112, although other embodiments have other array arrangements, as will be described further below.

Below layer 106 is a horizontal layer 107 of anisotropic conductive tape, such as z-axis conductive tape. This layer provides conductive connectivity between the layers immediately above and below in a removable way to allow security device 100 to be opened for maintenance, repairs or servicing. In contrast, solder forms a more permanent bond between layers. For example, if layers 104 to 106 are connected permanently by solder 105, a service person who knows the location of layer 105 can insert a tool such as a screw driver and prise apart layers 106 and 108 to open the device.

The bottommost layer of security device 100 is layer 108. Layer 108 includes a grid-like array of fine traces 111, similar to fine traces 110 of top layer 104. The grid-like array of fine traces may be contained in an internal layer and not visible on the bottom side of layer 108 and/or the grid layers may be discontinuous, for example by use of a plurality of sub-grids (not shown) which are positioned at different depths and connected together by vias. In the embodiment illustrated, layer 108 also includes circuitry 109, which is the circuitry that security device 100 protects from tampering.

Although the layers of the security device have been described with reference to FIG. 1, it will be understood by one skilled in the art that other layered arrangements are also possible according to the invention and that described is included by way of example only. For example, additional layers could be added or the solder and/or z-axis conductive tape layers are included in preferred embodiments only and may in some embodiments be placed in different positions in the stack of layers.

Circuitry 109 may include any electronic circuitry which requires protection from security device 100, including data storage means where the stored data is sensitive. Examples of such sensitive data typically include encryption algorithms, keys or other such cryptographic or coding data, data which has been encrypted or encoded, non-encrypted data, or other such data as requires protection by such a secure device. Circuitry 109 typically also includes means to receive the sensitive data from a source, such as a credit card reader, encrypt the data using a stored or received algorithm and send the encrypted data to an external destination.

Additionally, circuitry 109 or other circuitry in cavity 103 includes tamper detecting means. Tamper detecting means monitors certain electrical properties of security device 100 and detects an attempt to penetrate the closed housing when the monitored electrical properties change by a predetermined amount, as will be described in more detail below. As a result of a tamper detection event, actions can be taken to protect the sensitive data. Typically, such actions may include deleting the stored sensitive data from the device and/or sending an alert, for example to an alarm device or alert monitor.

Tamper detecting means detects an attempt to penetrate the closed housing by detecting a change in the electrical properties of the closed housing and/or the array(s) of conductor paths, i.e. of fine traces 110, fine traces 111 or vias 112. For example, removal of one of the layers in security device 100 would break the electrical connection(s) between layers and thus initiate a tamper detection event by a method known to those skilled in the art.

Fine traces 110 and 111 protect security device 100 from an attempt to penetrate the closed housing from the top and bottom of the device respectively. If a trace is broken and/or if adjoining or distant traces are short circuited together this may be detected according to known methods and a tamper event initiated. The array(s) of vias 112 of layer 106 protects security device 100 from penetration of the closed housing from the side. If an attacker pierces or breaks one of the vias this is detected and a tamper event is triggered. Similarly, if two vias are shorted together the change in resistance is detected and a tamper event triggered.

Figure 9:
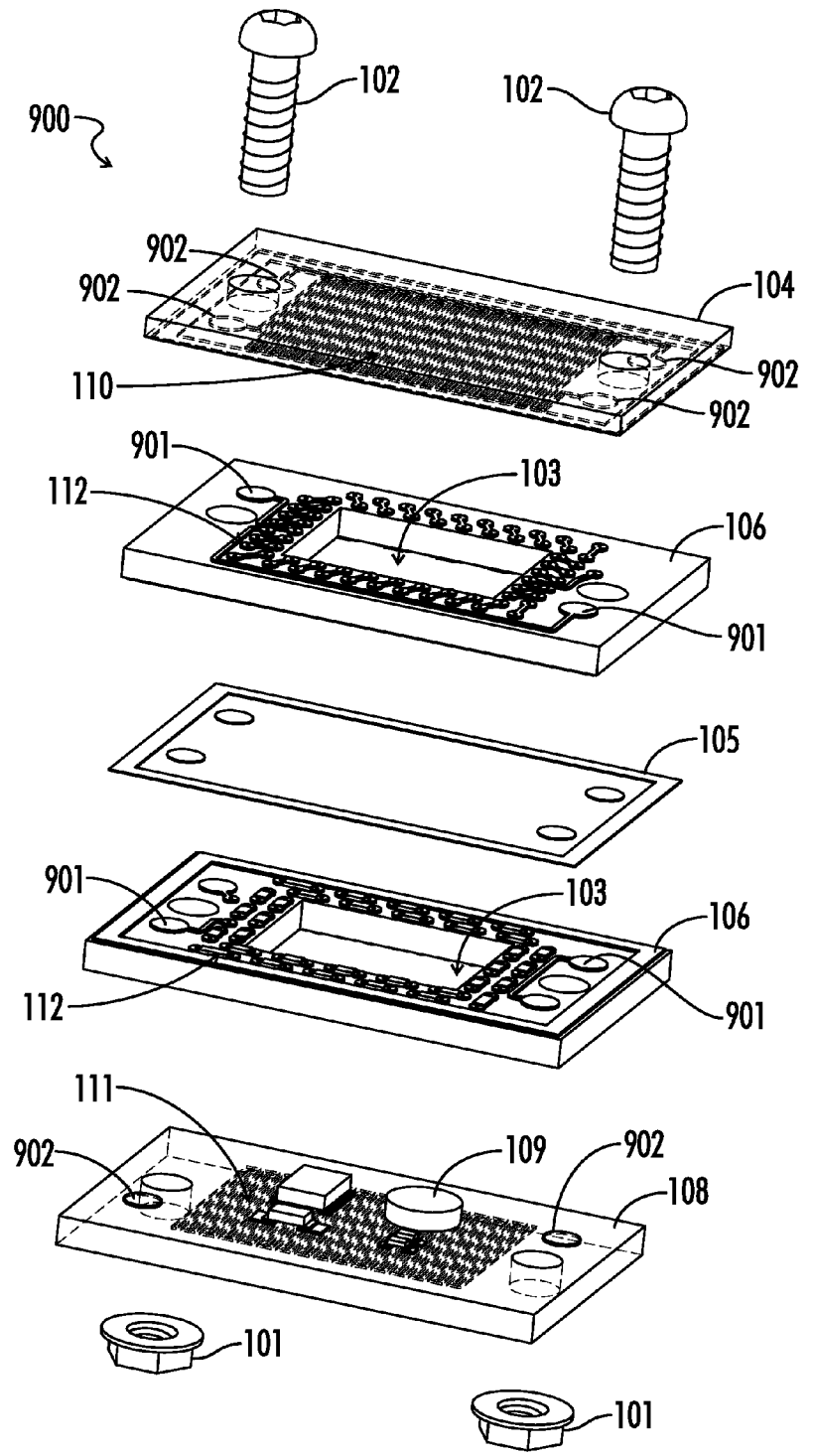
FIG. 9 is an exploded isometric view illustration of a security device according to a further embodiment of the invention.

Another embodiment of a security device generally referenced 900 is shown in FIG. 9. This embodiment has the same general structure as that of FIG. 1, and like reference numerals identify like features of the embodiments of FIGS. 1 and 9. The embodiment of FIG. 9 differs from that of FIG. 1 in that z-axis tape 107 is not required. This results in a cost saving and allows the stack of layers to be taken apart very easily.

As shown in FIG. 9 the outer surfaces of the one or more middle layers 106 may have raised conductive pads 901. Similarly, the inner surfaces of the upper and lower layers 104 and 108 may include raised conductive pads 902. In some embodiments only pads 901 may be required, and in other embodiments only pads 902 may be required. In other embodiments, both pads 901 and 902 may be present.

Pads 901 and 902 allow electrical contact to be made between the layer(s) 106 and the layers 104 and 108. Pads 901 and 902 are raised to accommodate irregular outer surfaces of layer(s) 106 due to the presence of resistors or other impedance producing devices (as will be described further below). Layers 106 are attached to each other by solder layer 105. The raised pads 901 and 902, together with the solder layer 105, enable a conductive bridge to be formed between the layers 104, 106 and 108.

In one embodiment pads 901 and 902 are created with solder and are plated more heavily with nickel before being finally flash gold plated.

In another embodiment the impedance producing devices may be embedded into layers 106.

Figure 2:
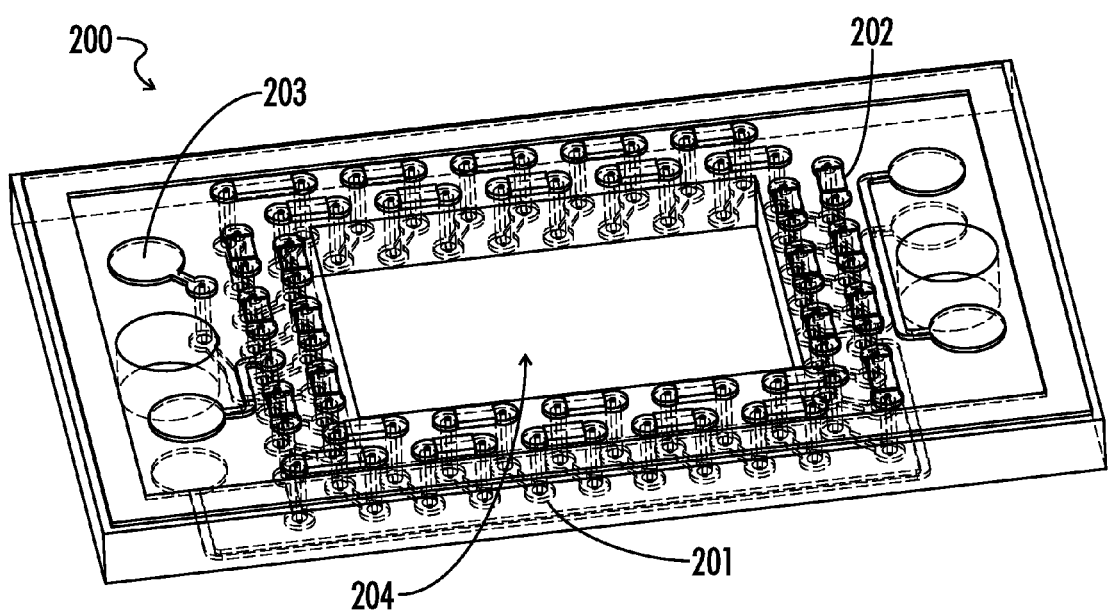
FIG. 2 is an isometric illustration of a security device layer according to an embodiment of the invention.

FIG. 2 is an illustration of a security device layer 200 according to an embodiment of the invention. Layer 200 is similar to layer 106 illustrated in FIG. 1. Vias 201 are illustrated in an array arrangement around hole 204. In the embodiment shown, there are two rows of vias with the vias in one row positioned opposite to the gaps between vias in the other row. Such an arrangement is included by way of example and other arrangements of an array of conductor paths or vias are possible. For example, other numbers of rows may be included and other relative positioning of vias arrangements may be used. A greater number of rows is more difficult to penetrate and therefore offers greater security. In the corners of the array, or at points where more protection is required, more rows or simply more vias may be used. In one embodiment, one set of vias are electrically connected separately to another set of vias and if a via from either set comes into contact with a via from another set a tamper event is triggered.

FIG. 2 further illustrates conductor pads 203 which electrically connect layer 200 with neighboring layers. Also as shown in FIG. 2, vias may optionally be connected by resistors 202, as will be described further below.

When the layers of the security device are connected together the array(s) of conductor paths including fine traces and/or vias entirely surrounds the internal cavity of the closed housing. To avoid weak points in the arrangement, there are no gaps between arrays. In the embodiment illustrated in FIG. 1 this is achieved by the area covered by fine trace grids 110 and 111 overlapping the inner edge of the array of vias 112 of layer 106.

The arrangement of vias shown in FIGS. 1 and 2 are limited in density by the size of the annular rings forming the 'pads' where each via is drilled. These rings must have a certain minimum spacing between them, as specified by PCB manufacturers, to eliminate accidental shorting. An alternative arrangement is illustrated in FIGS. 3 and 4.

Figure 3:
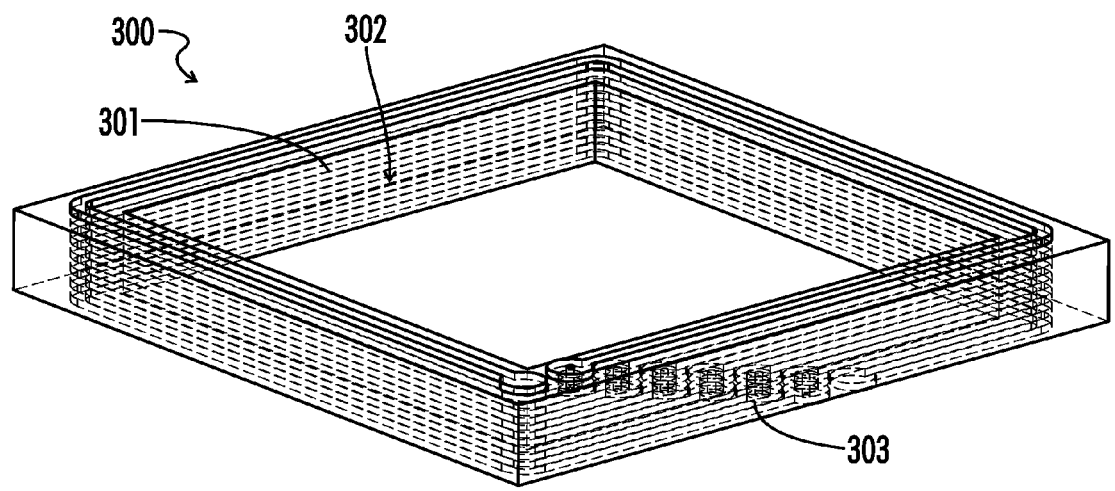
FIG. 3 is an isometric illustration of an arrangement of vias in a security grid according to an embodiment of the invention.
Figure 4:
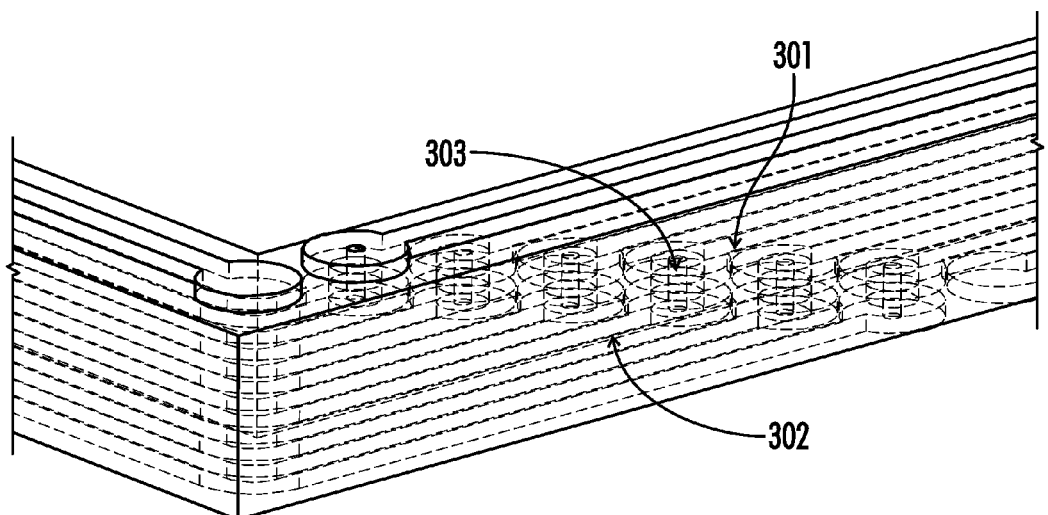
FIG. 4 is an isometric illustration of an arrangement of vias in a security grid according to the embodiment of the invention shown in FIG. 3.

FIGS. 3 and 4 illustrate an arrangement of vias in a security grid 300 according to an embodiment of the invention. FIG. 4 is a magnified view of a part of security grid 300 shown in FIG. 3 and like reference numerals correspond to like elements.

Security grid 300 is formed from tracks such as tracks 301 and 302 on each layer of a multi-layer PCB. The tracks are arranged in a multi-level ring forming the sides of the secure closed housing of the security device. Tracks on adjacent rings are electrically connected by way of buried vias. For example, buried via 303 electrically connects tracks 301 and 302. Each buried via does not span the entire thickness of the grid but connects neighboring tracks. Each track is connected to at least one other track. In the embodiment shown in FIGS. 3 and 4 each buried via connects only neighboring tracks to each other, although other arrangements are possible as will be evident to those skilled in the art.

If the track rings are penetrated or shorted a tamper event is detected. The density of protection is greater than the embodiment shown in FIGS. 1 and 2 because up to 8 layers of tracks may be placed within a 1 mm thick PCB. The number of layers may be more or less depending on PCB manufacturing capabilities and other considerations.

One drawback of some known security devices is that a section of a protecting grid may be shorted to render it ineffective. An attacker could then penetrate the grid through the shorted section. The invention overcomes this shortfall of conventional devices by detecting changes in impedance measurements as described below.

Figure 5:
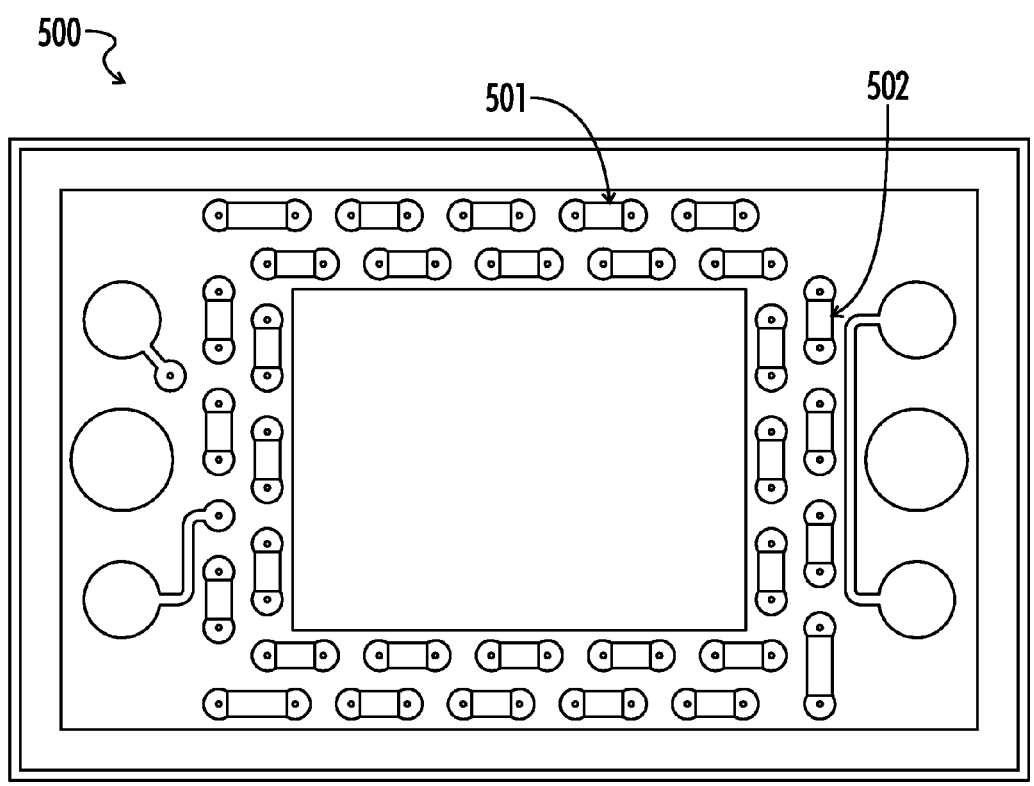
FIG. 5 is a plan view of a layer of a security device according to an embodiment of the invention.

FIG. 5 is a plan view of a layer 500 of a security device according to an embodiment of the invention. The layer shown in FIG. 5 is identical to that shown in FIG. 2, only in plan view. In FIG. 5, neighboring vias are connected by resistors such as resistors 501 and 502. Where alternative arrays of conductor paths other than vias are used, resistors are connected between or along the paths in a corresponding manner. In alternative embodiments of the invention, paths having predetermined resistances are used. The resistance, or in other cases impedance, may be predetermined in the sense that a path of known resistance is used. Alternatively and preferably, the resistance may be determined at each measurement of the resistance as will be described further below and thereafter the resistance is therefore predetermined. In an alternative embodiment, the resistance or impedance is selected in that it has a specific value, although what that value is may not be known. The actual values of the resistances or impedances are not vital, as long as they are sufficient to allow for sufficiently small changes indicative of an attack to be detected.

The use of resistors increases the overall resistance of the array or grid and allows the tamper detecting means to detect much smaller penetrations than is possible with other systems. Without the resistors it is still possible to penetrate a device by shorting a section of the fine trace grid without changing the resistance of the conductor path enough to be detected.

While the preferred embodiment in FIG. 5 is described in relation to resistors and the detection of attack by a change in a resistance measurement above a predetermined threshold, it will be understood that in other embodiments an attack or penetration attempt may also be detected by a change in impedance. The term "impedance measurement" is used in general terms to refer to any of: impedance magnitude; phase difference; a resistance measurement; a reactance measurement; an admittance measurement; a capacitance measurement; an inductance measurement or any combination thereof. In the discussion below, resistance measurements are discussed by means of example only. Where resistors are referred to, it will be known that capacitors may be used in the case of capacitance measurements and/or inductors may be used in the case of inductance measurements.

For the purposes of this specification a change in a measurement "above a predetermined threshold value", or similar phrase, means that the magnitude of the change in the measurement exceeds a certain value. That is, the change may be negative or positive but only the absolute value of the change needs to be greater than the threshold for the change to be above the predetermined threshold value.

The resistance of the array or grid of conductor paths is measured periodically. The interval between measurements may vary but in a preferred embodiment the period is of the order of 100 ms. As a result, a potential attacker would have a maximum of 100 ms to penetrate the grid and restore its resistance to the same level as prior to the attack to avoid detection as a result of changed resistance. In other embodiments, other time intervals are provided. The exact length of interval between measurements is not important so long as the interval is sufficiently short to prevent circumvention during the interval. The interval may vary from one device to another and is generally based on the power available to the device. For example, more frequent resistance checks will consume more power than less frequent checks but will reduce the "window" of possible circumvention.

The resistance is measured by applying a reference voltage to one side of the grid and an analogue-to-digital converter is used to measure the resulting voltage at the opposite side of the grid. In embodiments where other properties such as capacitance are measured, known techniques are used. On each cycle the voltage, and consequently the resistance, is compared to a prior measurement and if the change in measured or calculated resistance is above a predetermined threshold value the tamper detecting means triggers a tamper event. If no tampering is detected, then the resistance and/or voltage measurement is stored for comparison with the measurements at the next cycle period. By comparing a measurement with the previous cycle's value allows the resistance to change slowly over time as may occur as a result of temperature or other environmental factors, while still reacting immediately to attacks involving a shorting or breaking of the grid.

To ensure that no external voltage is applied to the grid to foil detection using the above method, each cycle begins with a measurement of the resistance and/or voltage of the grid when no voltage is being applied. The resulting voltage measurement should be zero or very close to zero. If this is not the case then a tamper event is triggered.

Figure 6:
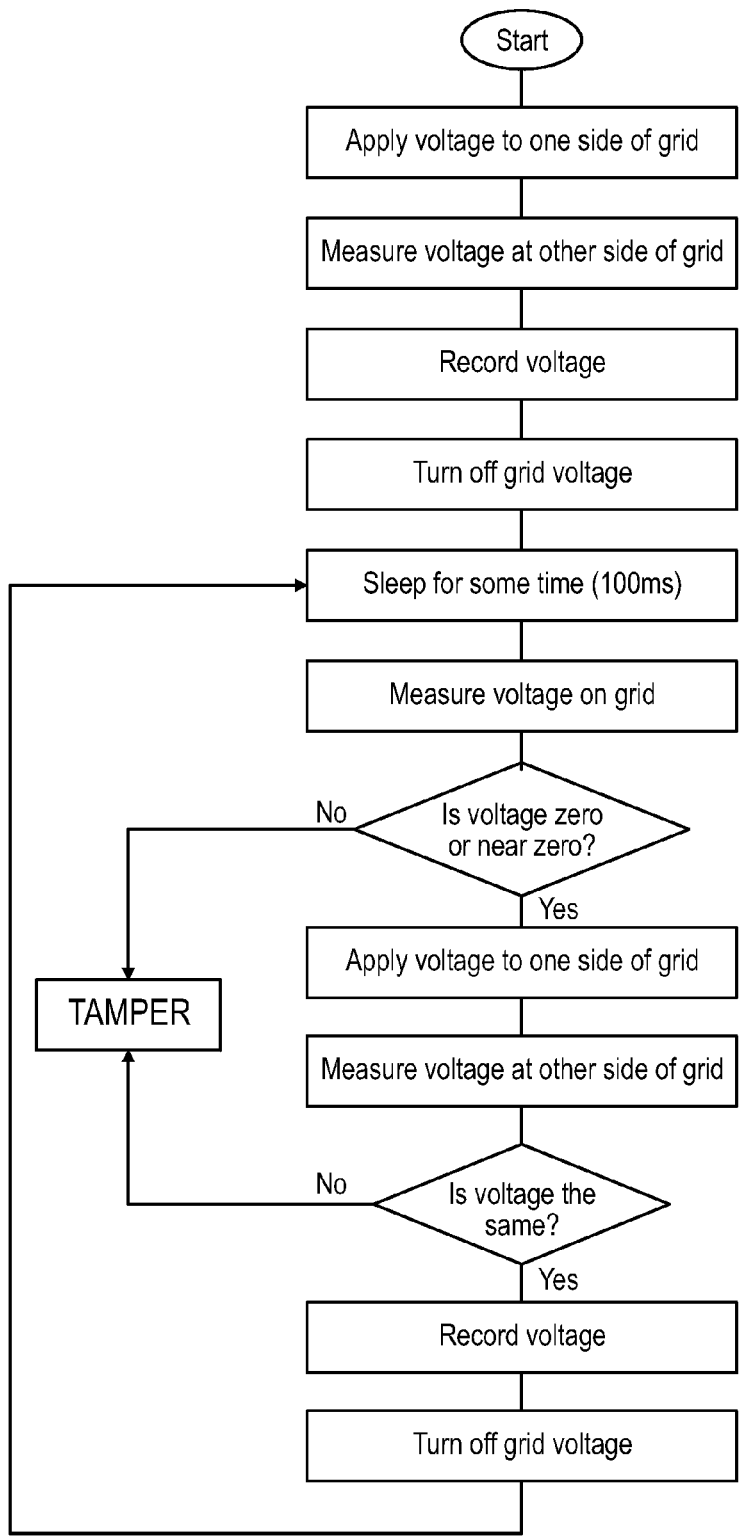
FIG. 6 is a flow chart illustrating a method of monitoring the resistance of a grid according to an embodiment of the invention.

FIG. 6 is a flow chart illustrating the method of monitoring the resistance of the grid according to the embodiment of the invention described above. This may be used with or without resistors being placed throughout the grid.

While a preferred embodiment of the invention, such as that shown in FIG. 5, uses resistors placed throughout the via grid, other arrangements of resistors are also possible according to the invention. For example, resistors may be distributed in other patterns and densities throughout the grid, or single resistors may be used. In addition, resistors of varying values and/or wide tolerances are used in some embodiments to further decrease the probability that an attacker could duplicate the exact resistance required. Widely varying resistances increase protection since penetration in different areas of the device requires different resistance matching. Furthermore, varying resistances make it difficult to ascertain from one device to another what correct matching resistance is required. In some embodiments, the resistors are surface mounted components and in other embodiments are carbon-printed directly on the PCB.

Referring again to the embodiment of the invention shown in FIG. 1, one or more layers of a material adapted to seal the housing from dust or moisture penetration, such as solder layer 105, are used to create an environmental barrier to prevent dust, dirt, water or other unwanted matter from entering the inside of the closed housing of security device 100. The underside of the layer immediately above the solder layer—in the case of the embodiment shown in FIG. 1 this is layer 104—has a flat portion of an O-ring portion around its edge. The layer immediately below the solder layer—in this case layer 106—has a corresponding flat O-ring portion around its edge. The solder layer connects the two portions to both physically and electrically connect layers 104 and 106. The soldering is done by conventional methods, for example by screen printing on one of the layers followed by use of either a reflow or vapor phase reflow oven with the two layers held together by clamps or weights.

Figure 7:
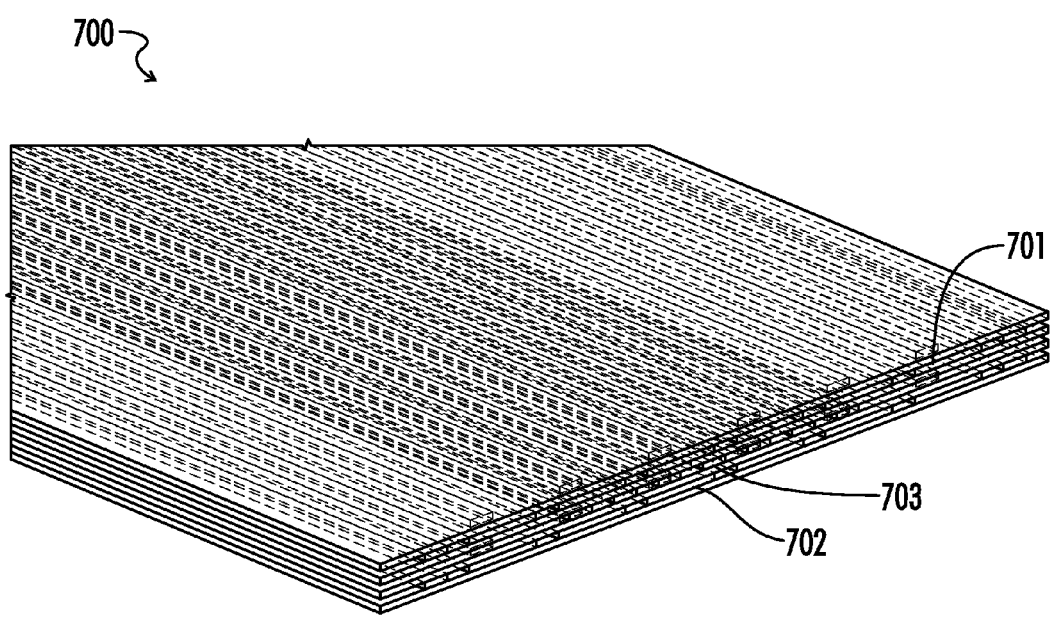
FIG. 7 is an isometric illustration of a secure interface device according to an embodiment of the invention.

FIG. 7 is an illustration of a security device 700 according to an embodiment of the invention. Security device 700 allows sensitive data to be protected against tampering or eavesdropping when it is interfaced or routed between secure devices through an insecure area.

Security device 700 uses a multi-layer thin and substantially flexible PCB. In some embodiments the thickness of the flexible PCB is around 0.25 mm although other embodiments may have other dimensions. Upper and lower layers 701 and 702 respectively are positioned adjacent to a central inner layer 703 which carries the secure data transmission signals. In the embodiment shown, upper and lower layers 701 and 702 sandwich central inner layer 703 between them. The flexible PCB is very thin and may not be pulled apart without damage, so attack between the upper and lower layers from the sides is very difficult. In some embodiments the fragility of the flexible PCB may be increased by non-conventional construction techniques such as screen printing the PCB with brittle conductive ink. In an alternative embodiment, the upper and lower layers entirely surround the central inner layer to mitigate any side attack risk.

Upper and lower layers 701 and 702 have an array of conductor paths such as a grid of fine traces. In use, the arrays are electrically connected to a tamper detecting means, which may be a separate unit, part of the security device or a tamper detecting means in a secure device the interface device is interfacing to. As has been described in relation to earlier embodiments any attempt to penetrate the grid to access the inner layer carrying the secure data signals by breaking or shorting the fine traces is detected by the tamper detecting means and a tamper event is triggered.

Tamper detecting means monitors the electrical properties of the array of conductor paths in order to detect, either by known methods or by detecting a change in impedance or similar of the conductor paths in a manner similar to that discussed above, an attempt to penetrate the grid. If such an attempt is detected, a tamper event is triggered. In some embodiments, this results in the secure data being deleted from the source device. In other embodiments, this results in the transmission of the secure data through the interface being terminated. In still other embodiments, this results in an alert being sent, for example to an alarm device or alert monitor.

Figure 8:
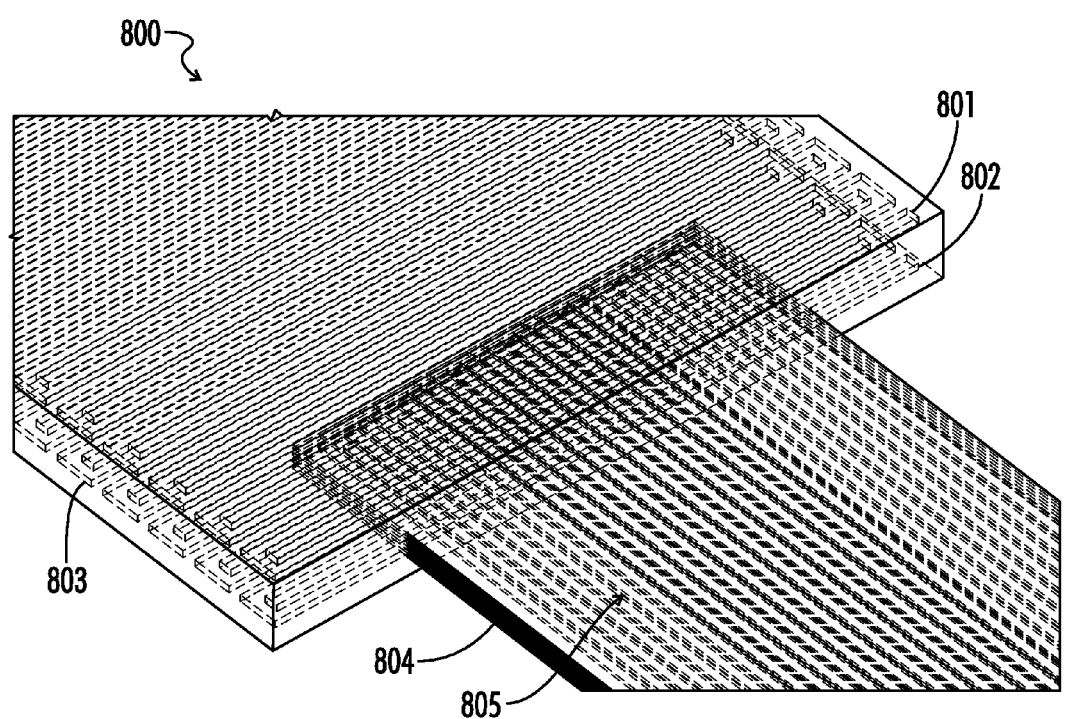
FIG. 8 is an isometric illustration of a secure interface device according to an embodiment of the invention.

FIG. 8 is an illustration of an alternative security device 800 according to an embodiment of the invention. Security device 800 is similar to security device 700 except that security device 800 has a surrounding formed from a substantially rigid PCB 803. Rigid PCB 803 has grids of fine traces 801 and 802 on its upper and lower sides to form the secure grid protection for flexible PCB 804 which includes secure data transmission signal carriers 805. Rigid PCB 803 may also include a plurality of vias such as are shown in any of the embodiments of FIG. 2, 3 or 4 to further protect against penetration from the sides.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavor in any country in the world.

Wherein the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention as set forth in the appended claims and without diminishing its attendant advantages. It is therefore intended that such changes and modifications be included within the present invention.

What is claimed is:

1. A security device for protecting stored sensitive data including:
    a closed housing formed from a plurality of electrically connected layers, each said electrically connected layer comprising at least an array of conductor paths, said array of conductor paths including;
    a grid of traces on at least one side of the closed housing;
    a plurality of vias on at least one side of the closed housing; wherein,
        said vias electrically connect at least a subset of the electrically connected layers,
        one row of said vias is arranged in a closed loop around at least one of
        said plurality of electrically connected layers, and
        said vias includes at least one buried via,
    there being at least one conductor path of predetermined impedance between at least two of said plurality of vias,
    a memory means adapted to store sensitive data being contained within said closed housing, and
    a tamper detecting means adapted to detect a change in impedance of the array of conductor paths above a predetermined threshold value.

2. A security device as claimed in claim 1 wherein the security device includes at least one conductor path of selected impedance between at least two of the plurality of vias.

3. A security device as claimed in claim 1 wherein the tamper detecting means measures the impedance of the array of conductor paths periodically and compares the measured impedance with a prior measurement to detect a change in impedance.

4. A security device as claimed in claim 1 wherein the array of conductor paths contains a plurality of paths having predetermined or selected impedance.

5. A security device as claimed in claim 4 wherein the plurality of paths having predetermined or selected impedance includes paths having a variety of impedances and/or wide impedance tolerances.

6. A security device as claimed in claim 1 wherein the tamper detecting means is adapted to detect a change in resistance of the array of conductor paths above a predetermined threshold value.

7. A security device as claimed in claim 1 wherein the array of conductor paths contains a plurality of paths of predetermined or selected resistance.

8. A security device as claimed in claim 1 wherein the closed housing includes a layer of material adapted to seal the housing from dust or fluid penetration.

* * * * *